United States Patent [19]

Dawson et al.

[11] Patent Number: 4,682,348

[45] Date of Patent: Jul. 21, 1987

[54] LIFE SAFETY AUDIO SYSTEM HAVING A VOICE SYNTHESIZER AND A CONSTANT VOLUME TELEPHONE NETWORK

[75] Inventors: Brian D. Dawson; James R. Leacock, both of Lincoln, Nebr.

[73] Assignee: Emhart Industries, Inc., Indianapolis, Ind.

[21] Appl. No.: 734,554

[22] Filed: May 16, 1985

[51] Int. Cl.4 .......................................... H04M 11/04
[52] U.S. Cl. ...................................... 379/37; 379/49; 379/414; 379/170; 340/692
[58] Field of Search ................. 179/5 P, 5 R, 18 AD, 179/18 BC, 37, 40, 99 A, 99 R; 379/49, 37, 167, 170, 414; 340/692

[56] References Cited

U.S. PATENT DOCUMENTS 2,912,503 11/1959 Grandstaff et al. ............ 179/18 BC
4,278,843 7/1981 Hestad ............................ 179/18 BC
4,558,181 12/1985 Blanchard et al. .................. 179/5 P

OTHER PUBLICATIONS

Keefe and McDowell, "Enhancement of a Radiation Safety System Through the Use of a Microprocessor Controlled Speech Synthesizer", IEE Transactions on Nuclear Science, vol. NS-28, No. 1, Feb. 1981, pp. 643-645.

Primary Examiner—Gene Z. Rubinson
Assistant Examiner—M. E. Connors
Attorney, Agent, or Firm—Robert F. Meyer; Carl A. Forest

[57] ABSTRACT

A life safety system for monitoring a building has a plurality of detectors for detecting alarm conditions located throughout the building, a plurality of speakers located throughout the building, a source of pre-stored voice messages which can be broadcast over the speakers, and a telephone network. The improvement is a voice synthesizer for providing the source of pre-stored voice messages and a constant volume telephone system. The constant volume telephone system has a telephone line and a plurality of telephones which can be connected to the telephone line, and a power supply having an adjustable output voltage which provides the voltage for the telephone line. A sensing and adjusting circuit senses the number of telephones off-hook and causes the power supply to be adjusted in response to the number of telephones off-hook.

3 Claims, 5 Drawing Figures

LIFE SAFETY AUDIO SYSTEM HAVING A VOICE SYNTHESIZER AND A CONSTANT VOLUME TELEPHONE NETWORK

This invention relates to life safety systems and more particularly to life safety systems having pre-stored voice messages and a telephone network.

Commercial buildings constructed in accordance with modern day building practices are generally required to have life safety systems. These systems detect dangerous conditions, such as fires, and cause alarms to be sounded. Many of these systems are for multi-zone applications. In a multi-zone system, an alarm can be selectively sounded in the various zones. Many of these systems also provide for selection from among a variety of different audio sources. Illustratively, the audio sources could comprise a source of stored voice messages, a source of live voice, and a source of alarm tones. Another feature that many life safety systems include is a satellite telephone network wherein one or more remotely located telephone units are connected to the command center of the life safety system which includes a master telephone unit.

Heretofore, life safety systems have used tape recorders as the means for providing a source of the stored voice messages. The message is pre-recorded on a length of magnetic tape in the form of a cassette, cartridge or reel-to-reel tape.

Using tape decks to provide the source of stored voice messages has major drawbacks. First, the mechanical components used in the tape playback machines wear out over time requiring periodic adjustment or replacement. Second, the magnetic pick-up medium (tape head) requires periodic cleaning and replacement. Whenever the magnetic tape is passed over the tape head, oxide from the tape rubs off and is left on the head. Unless the head is cleaned frequently, the oxide can build up on the head to a point where audio quality and level are reduced. Additionally, tape-head contact also causes the head to deteriorate until a total loss of audio output occurs. Third, systems utilizing a tape deck do not ensure the proper operation of the tape playback system until it is called upon to operate in an actual emergency situation. This is primarily due to the fact that operation of the tape playback machine and associated electronics requires a substantial amount of additional power over and above that required to operate the life safety system under normal conditions. This expensive energy is deemed unnecessary until the unit is actually called upon to operate.

Satellite telephone systems which are currently available in life safety systems typically comprise a pair of wires (hereinafter referred to as the "telephone line") which have a voltage impressed across them. When a satellite telephone is activated, it is electrically connected across the telephone line. If someone speaks into the satellite telephone, the effective resistance exhibited by the telephone varies at the audio frequencies of the spoken voice. The varying resistance of the telephone mouthpiece causes the current that is supplied by the voltage impressed across the telephone line to vary. This changes the instantaneous value of the voltage impressed across the telephone line. Therefore, speaking into the satellite telephone results in the voltage impressed across the telephone line varying at an audio frequency rate. The voltage across the telephone line, which is connected across the master telephone of the life safety system, causes the current through the master telephone to also vary at the audio frequency rate. This changing current causes the voltage across the master telephone earpiece resistance to change, which is converted to sound by the earpiece.

Activating additional satellite telephones which are connected to the telephone line places the equivalent resistance of each satellite telephone in parallel with all of the other telephone units electrically connected to the telephone line. This has the effect of reducing the overall resistance presented to the voltage impressed across the telephone line. The overall resistance presented to the voltage across the telephone line is directly related to the total number of satellite telephones electrically connected to the telephone line. This reduction of the total resistance causes the voltage impressed across the telephone line to be reduced to a point where the changing voltage due to the varying resistance of a telephone mouthpiece which someone is speaking into cannot produce sufficient current through the individual satellite telephones for efficient operation. This results in a total loss of volume in the overall telephone system. Prior art life safety systems which include satellite telephone networks have heretofore been typically able to have only three satellite telephones connected to the telephone line at any one time before audio volume is lost.

The reduction of the voltage impressed across the telephone line due to the addition of satellite telephones being electrically connected to the telephone line causes the major portion of the volume loss. Attempting to keep the voltage impressed across the telephone line at a constant average value will not totally solve the problem because each additional satellite telephone electrically connected to the telephone line acts as a current shunt. The reduced current causes a lower audio voltage on the telephone line resulting in lower volume when additional satellite telephone units are electrically connected across the line.

Additionally, satellite telephones must be connected in a parallel fashion in order to operate. As mentioned, this type of connection will reduce the current produced by a single satellite telephone whenever it is spoken into.

It is an object of this invention to provide a digital voice synthesizer for life safety systems which eliminates the problems associated with using magnetic media for storing voice messages.

It is another object of this invention to provide a source of stored voice messages for life safety systems wherein the proper operation of the voice unit is assured at all times.

Another object of this invention is to provide a satellite telephone system for life safety systems wherein the problem of low volume caused by using too many satellite telephone units is overcome.

In accordance with this invention, a life safety system has a digital voice synthesizer for providing a source of stored voice messages. The digital voice synthesizer includes means for storing a variety of different voice messages. The life safety system includes means for selecting one of the stored voice messages and outputting it through a voice processor included in the digital voice synthesizer to produce a voice output. The life safety system also includes a constant volume telephone system which has a telephone line and a plurality of satellite telephones which can be connected to the telephone line. The telephone system includes means for sensing the number of satellite telephone units which are off-hook and adjusting a voltage level of the telephone line voltage accordingly.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
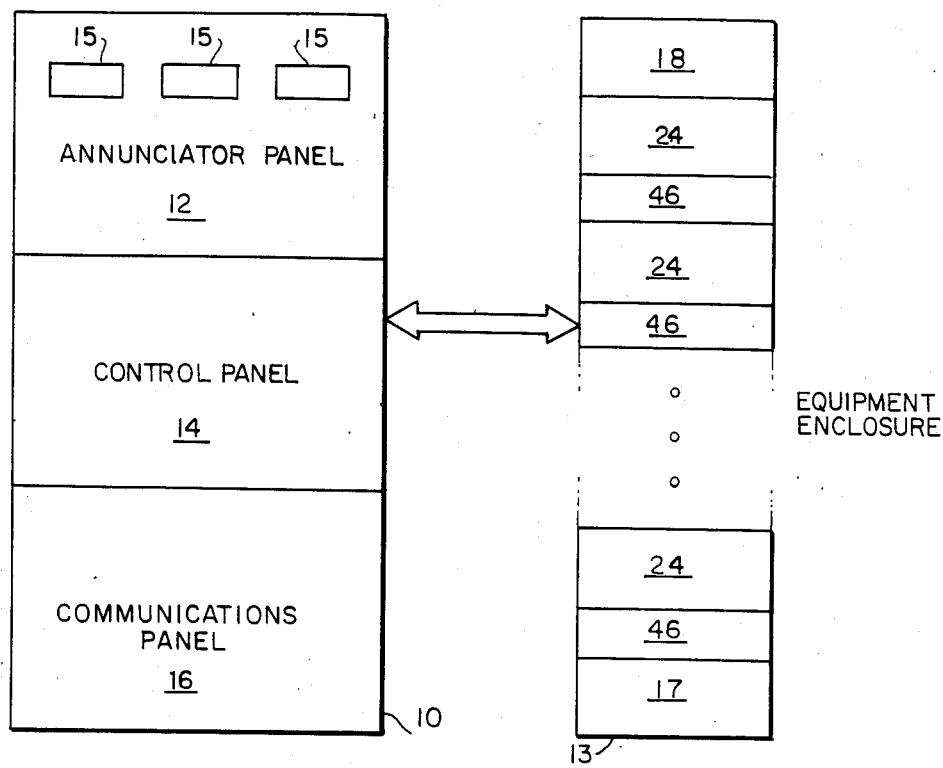
FIG. 1 is a block diagram of a command center of a life safety system.

Referring to FIG. 1, a command center 10 for a life safety system is shown. Illustratively, the life safety system could be an SAS-200 Firefighter's Communications/Evacuation System manufactured by Notifier Company of the Emhart Electrical/Electronic Group, 3700 North 56th Street, Lincoln, Nebr. 68504. The command center 10 includes an annunciator panel 12, a control panel 14 and a communications panel 16.

The command center 10 is coupled to an equipment enclosure 13 which contains amplifiers, interface cards, control cards, and other such equipment. Equipment enclosure 13 contains an interface controller card 18, interface slots 24, and terminal card slots 46. Illustratively, each interface controller card 18 has sixteen interface slots 24 and terminal card slots 46 associated with it. All the field wiring which runs to remote devices and alarm detectors terminates in the equipment enclosure at the terminal card slots 46. The equipment enclosure and command center can be located in separate areas up to 300 feet apart. Typically, the command center 10 is placed in a building lobby while the equipment enclosure is put in an equipment room accessible only to authorized personnel.

The annunciator panel is used to indicate the status of a wide variety of circuits which are distributed throughout the building which the life safety system monitors. Illustratively, these include alarm initiating circuits, alarm indicating circuits, telephones, speakers, fans, elevators, and door holders. The annunciator panel 12 shows at a glance the status of circuits throughout the building. Illustratively, annunciator panel 12 could include a plurality of visual indicators 15 wherein each visual indicator 15 can be illuminated with a variety of different colors. Illustratively, the color would indicate the condition being annunciated. For example, red could be for an alarm, yellow for trouble and green for activated non-alarm devices. Also, each visual indicator 15 can be pulsed at a frequency which indicates which audio source is connected to it. For example, if a source of pre-stored voice messages is used as the audio source to stimulate selected speaker zones, a visual indicator 15 which indicates that the source of pre-stored voice messages has been selected would pulsate at the same frequency at which the visual indicators 15 for the selected speaker zones pulsates.

Control panel 14 includes circuitry which allows an operator to send any of the available audio sources to any zone in the building. It also permits the operator to connect telephones and to control auxiliary devices such as fans, elevators and the like. Illustratively, the control panel 14 could include a keyboard for entering commands, a display for displaying instructions and messages, means for selectively outputting pre-stored voice messages to help the operator with system operation, an alarm review section, and other switches and indicators.

The communications panel 16 contains communications equipment for the operator. Illustratively, it includes a paging microphone permitting an operator to issue special instructions to any of the zones. Communications panel 16 also includes a master telephone handset for two-way communications with telephone zones and a second telephone handset for dedicated communications with one other remote phone. Illustratively, the second telephone handset could communicate with a remote phone located with the equipment enclosure 13.

Figure 2:
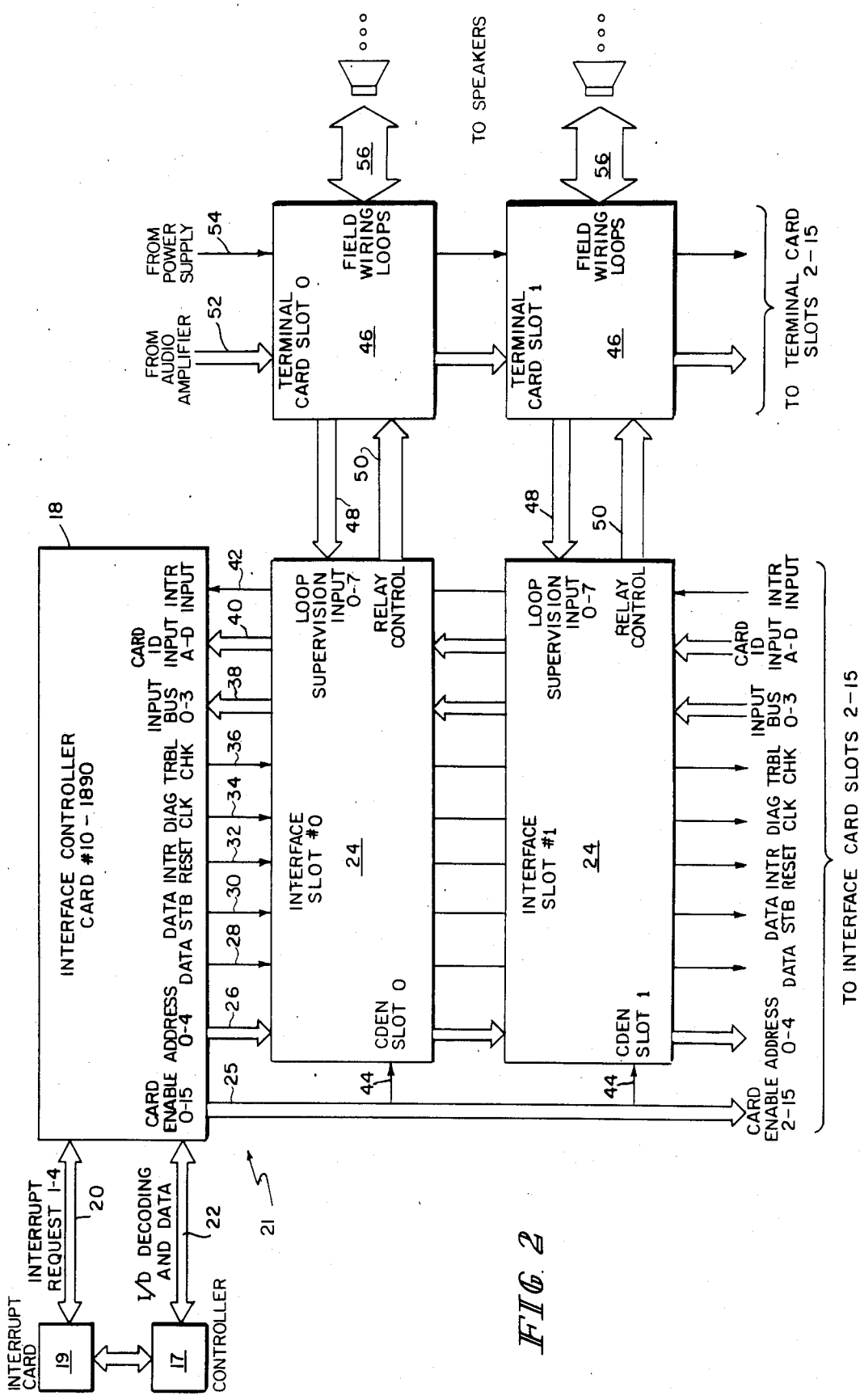
FIG. 2 is a block diagram of an interface of a life safety system.

Referring to FIG. 2, interface controller card 18, interface slots 24, and terminal slots 46 are shown in greater detail. FIG. 2 illustrates the interface between command center 10 and the remotely located devices of the life safety system which are field wired to the life safety system.

Interface controller card 18 is coupled to a communications interrupt card 19 over an interrupt request bus 20. Communications interrupt card 19 is coupled to controller 17 which is also coupled to interface controller card 18 over I/O decoding and data bus 22. Communications interrupt card 19 prioritizes the interrupts received by interface controller card 18 from interface slots 24 and informs controller 17 which of the interface slots 24 should be serviced first.

Interface controller card 18 communicates with controller 17 over I/O decoding and data bus 22 and interprets information received from controller 17 and translates it to the appropriate signals to be output to interface slots 24. Interface controller card 18 also receives signals from interface slots 24 and translates those signals into appropriate data to be transmitted back to controller 17 over I/O decoding and data bus 22.

Interface controller card 18 provides a communications bus 21 which is common to each interface slot 24. Communications bus 21 includes a card enable bus 25 which includes one line for each interface slot 24. These lines are used to enable the particular interface slots 24 to which they are connected. Illustratively, the card enable bus 25 includes 16 lines, numbered 0–15. There are illustratively 16 interface slots 24 associated with each interface controller card 18.

Bus 21 also includes an address bus 26. Address bus 26 is used to select the particular zone or zones in the building monitored by the life safety system for whatever action is desired. Illustratively, each interface slot 24 can control up to 8 zones. Therefore, address bus 26 will select which of the 8 zones is to be utilized and also can select certain control functions of the card plugged into an interface slot 24.

Also included in bus 21 is a data line 28. Data line 28 is essentially a data set line which takes on a high or low state, and is clocked into a latch which would be on the card plugged into an interface slot 24. Illustratively, data line 28 could be used to turn a relay on or off. A data strobe line 30 of bus 21 provides the pulses which are used to clock data line 28 into the particular latches.

An interrupt reset line 32 of bus 21 is utilized to reset the interrupt latches which cards plugged into interface slots 24 may have. The diagnostic clock line 34 of bus 21 is another strobe line which is used to strobe an LED on cards plugged into interface slots 24 which are experiencing a trouble condition, such as a comparator failing. This provides a visual indication that a particular card has experienced a trouble condition.

The trouble check line 36 of bus 21 is used to pull the comparators of the cards which plug into interface slots 24 low so that each comparator may be checked. Input bus 38 of bus 21 comprises status lines which return from the interface slots 24 and indicate the status of the cards plugged into the interface slots 24. The status depends upon the type of card and the zone which is being looked at. For example, it could be a trouble condition, an alarm condition, or the like.

Card ID input bus 40 is used by the cards plugged into interface slots 24 to indicate the type of card they are. Illustratively, each card plugged into an interface slot 24 has a plurality of switches which are set to indicate the type of card it is. Therefore, controller 17 is able to determine the particular card plugged into a particular slot 24 that it is addressing from the state of card ID input bus 40. Interrupt input 42 of bus 21 is used by the cards plugged into interface slots 24 to generate an interrupt which is serviced by controller 17.

A relay control bus 50 couples each interface slot 24 to an associated terminal card slot 46. A supervision loop bus 48 couples the terminal card slot 46 associated with an interface slot 24 to that interface slot 24. The supervision loop bus 48 is used to convey the supervisory information from the card plugged in a terminal card slot 46 to the associated interface slot 24. As those skilled in the art of life safety systems are aware, alarm loops and alarm detector loops are required to be supervised in order to assure the integrity of the system. The relay control bus 50, the use of which is dependent upon the particular type of cards plugged into the interface slot 24 and its associated terminal card slot 46, is used by the card plugged into the interface slot 24 to control relays which would be on the card plugged into the associated terminal card slot 46.

Each interface slot 24 also includes a card enable input 44. The card enable input 44 for each interface slot 24 which is associated with a particular interface controller card 18 is connected to a unique one of the lines of card enable bus 25. When controller 17 wishes to address a particular interface slot 24, it enables the line in the card enable bus 25 which is connected to the card enable input 44 of that particular interface slot 24.

The cards which plug into the interface slots 24 will typically contain the electronics which perform supervisory functions while the cards which plug into the terminal card slots 46 will include relays and other hardware which is controlled by the electronics of the cards plugged into the interface slots 24. All the field wiring for the remote devices terminates at the terminal card slots 46 of the equipment enclosure 13 (FIG. 1) This is indicated by the double arrows 56.

An audio channel bus 52 connects each terminal card slot 46 to the outputs of audio amplifier sections (not shown) of the life safety audio system. Illustratively, the outputs of the amplifier sections (not shown) are routed through an audio distribution card (not shown) which couples the appropriate output of each amplifier section to the proper audio channel. Illustratively, the audio channel output bus 52 includes an alarm tone output, a live voice output, and a pre-stored voice output.

A telephone power line 54 is also connected to each terminal card slot 46. It should be understood, that the individual cards which plug into the interface slots 24 and terminal card slots 46 will use only appropriate lines of bus 21, audio bus 52 and telephone power line 54. The particular lines which the cards will use will depend upon the type of card they are.

Figure 3:
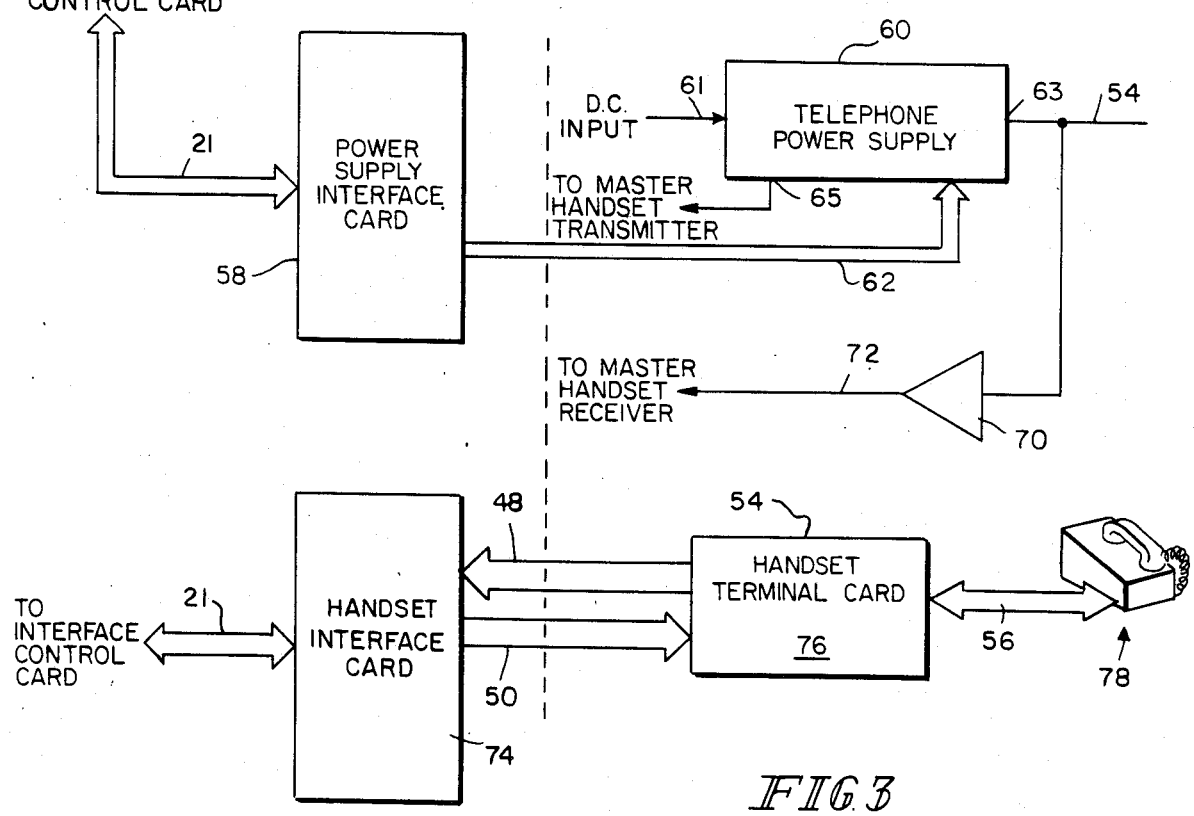
FIG. 3 is a block diagram of a constant volume telephone system in accordance with this invention.

Turning to FIG. 3, a block diagram of a constant volume telephone network is shown. The constant volume telephone network includes a telephone power supply control interface card 58 which plugs into an interface slot 24 (FIG. 2). The constant volume telephone network also includes a telephone handset interface card 74 which also plugs into an interface slot 24. A handset terminal card 76 plugs into the terminal card slot 46 which is associated with the interface slot 24 in which the handset interface card 74 is inserted. Handset interface card 74 is coupled to its associated terminal card 76 through the associated supervisory loop bus 48 and relay control bus 50. Handset 78 is connected to terminal card 76 by field wiring 56 which terminates at the terminal card slot 46 in which terminal card 76 is inserted.

Telephone power supply control interface card 58 is coupled to a telephone power supply 60 by telephone power supply control lines 62. Telephone power supply 60 also includes a DC power input 61 which is connected to a source of DC voltage (not shown). Telephone power supply 60 also includes a line modulation input 65 which is connected over master handset transmitter line 66 to the transmitter of the master handset (not shown). Telephone power supply 60 further includes an output 63 which is coupled to telephone line 54. Telephone line 54 is also coupled to an input of amplifier 70. The output of amplifier 70 is coupled over master handset receiver line 72 to the receiver of the master handset (not shown).

In operation, handset interface card 74 detects when handset 78 goes off-hook and generates an interrupt which is transmitted over interrupt line 42 of bus 21 to interface controller card 18 (FIG. 2). Interface controller card 18, in turn, transmits the interrupt over interrupt request bus 20 to communications interrupt card 19 (FIG. 2).

Communications interrupt card 19 prioritizes the interrupt and informs controller 17 (FIG. 2) of the interrupt condition. Controller 17 then addresses the handset interface card 74 and determines that handset 78 has gone off-hook. Controller 17 then causes telephone power supply control interface card 58 to program the telephone line 54 voltage by programming the telephone power supply 60 according to the number of satellite telephone handsets 78 off-hook. Controller 17 causes telephone power supply control card 58 to configure the telephone power supply control lines 62 so that the desired output voltage at output of telephone power supply 60 is achieved. The output voltage to which telephone power supply 60 is programmed for various numbers of handsets 78 being off-hook is shown in Table I.

TABLE I

| Number Phones Off-Hook | Line Ouput Voltage |
|---|---|
| 0 | 5 V |
| 1 | 5 V |
| 2 | 5 V |
| 3 | 10 V |
| 4 | 14 V |
| 5 | 17 V |

TABLE I-continued

| Number Phones Off-Hook | Line Ouput Voltage |
|---|---|
| 6 | 17 V |

In this embodiment of the invention, there can be up to 6 satellite telephone handsets 78 for each telephone power supply 60.

The master handset transmitter (not shown) which is coupled over master handset transmitter line 66 to modulation input 65 of telephone power supply 60 modulates the output voltage supplied by telephone power supply 60. Therefore, the output of telephone power supply 60 at output 63 is a DC voltage which is modulated by the master handset tranmitter and which swings about the DC voltage set with telephone power supply control lines 62. The modulated voltage on telephone line 54 is amplified by amplifier 70 and coupled to the master handset receiver (not shown) over master handset receiver line 72.

Figure 4:
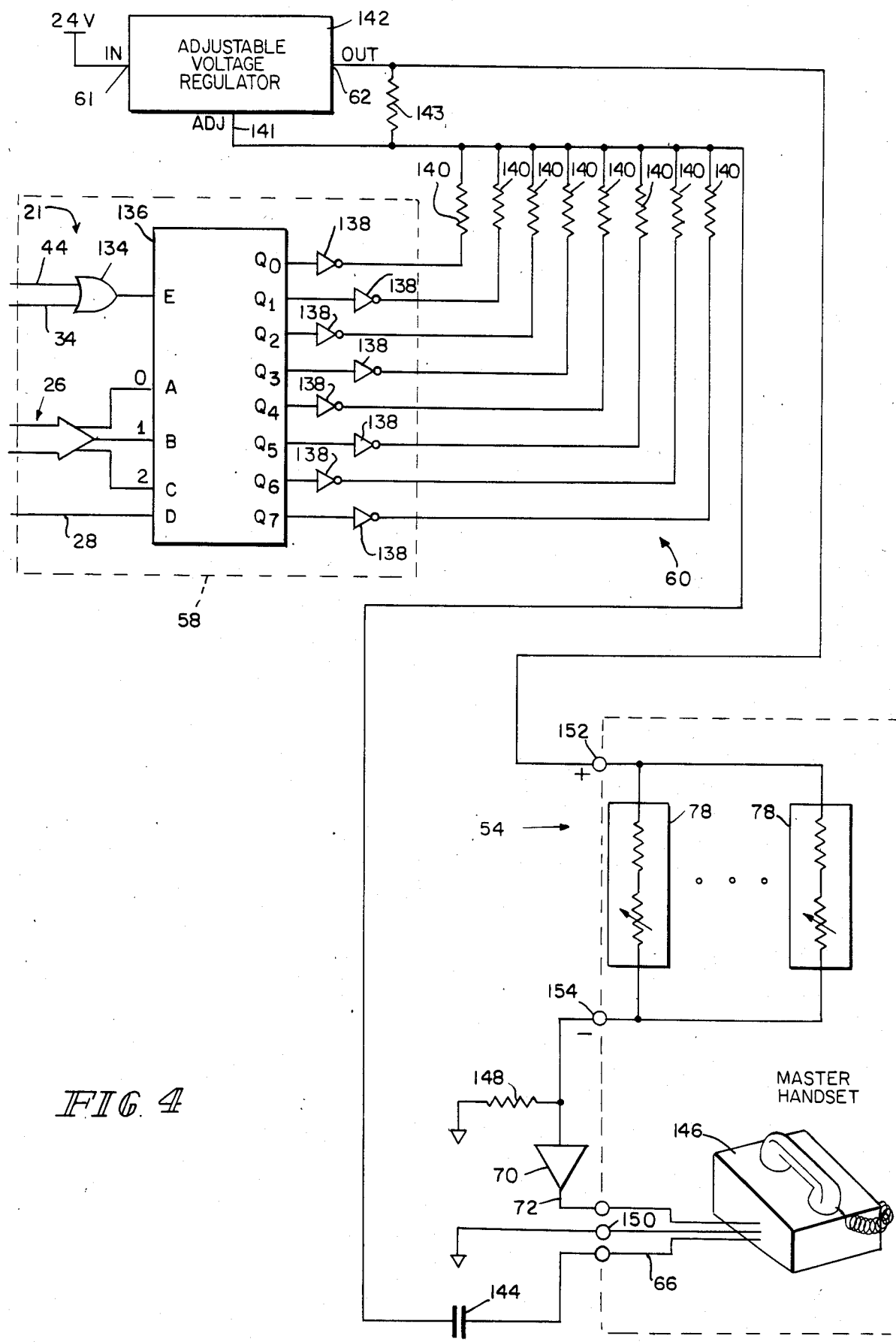
FIG. 4 is a schematic of a portion of a constant volume telephone system of this invention.

Referring to FIG. 4, a circuit schematic of portions of telephone power supply control interface card 58, telephone power supply 60 and associated circuitry is shown. Telephone power supply control interface card 58 includes an 8-bit addressable latch 136 which is illustratively a 74LS259 available from Texas Instruments Inc., P.O. Box 5012, Dallas, Tex. 75222. Latch 136 has an Enable input coupled to an output of OR gate 134. OR gate 134 has a first input coupled to card enable input 44 and a second input coupled to the diagnostic clock line 34 of bus 21. Latch 136 also has three address inputs coupled to address lines 0-2 of address bus 26 of bus 21. Latch 136 also has a data input coupled to the data line 28 of bus 21.

Latch 136 also has outputs Q0-Q7 coupled through inverters 138 and resistors 140 to adjust input 141 of adjustable voltage regulator 142. Illustratively, adjustable voltage regulator 142 is an LM-317 manufactured by National Semiconductor Corporation, 2900 Semiconductor Drive, Santa Clara, Calif. 95051.

Adjustable voltage regulator 142 includes the DC power input 61 which is coupled to a source of DC power (not shown), illustratively 24 VDC. Adjustable voltage regulator 142 also includes the telephone power supply output 63 at which the voltage for telephone line 54 is provided. Output 63 is also coupled through resistor 143 to adjust input 141.

A master handset 146 includes a transmitter which is coupled over transmitter lines 66 to one side of capacitor 144. The other side of capacitor 144 is coupled to adjust input 141 of adjustable voltage regulator 142. Illustratively, adjust input 141 of adjustable voltage regulator 142 comprises line modulation input 65 of telephone power supply 60. Master handset 146 also includes a common which is connected to common terminal 150. Master handset 146 also includes a receiver which is coupled to the output of amplifier 70 by master handset receiver line 72.

Remote telephone handsets 78 are schematically shown as a series combination of a fixed resistor and a variable resistor. One side of each remote handset 78 is coupled to the "plus" side 152 of telephone line 54 and the other side of each remote handset 78 is coupled to the "minus" side 154 of telephone line 54. The "minus" side 154 of telephone line 54 is coupled to the input of amplifier 70 and also through resistor 148 to common.

In operation, when the voltage of telephone line 54 is desired to be set to a certain level, controller 17 (FIG. 2) will set the appropriate line in card enable bus 25 so that the input of OR gate 134 connected to card enable input 44 will enable 8-bit address latch 136. Controller 17 will then set data line 28 of bus 21 to the appropriate state. Controller 17 will then set address lines 0-2 of address bus 26 of bus 21 to the appropriate state to address the desired latch in 8-bit addressable latch 136.

The address latch of 8-bit addressable latch 136 (one of outputs Q0-Q7) will then take on the state of the data line 28. Thus, by addressing the latches of 8-bit addressable latch 136 to cause outputs Q0-Q7 to be set high or low, the voltage at adjust input 141 of adjustable voltage regulator 142 can be set. The voltage at output 63 of adjustable voltage regulator 142 will be determined by the voltage at adjust input 141. Therefore, the voltage of telephone line 54 can be selectively determined.

Handsets 78, which are illustratively shown as a series combination of a fixed resistor and a variable resistor, will, when connected to telephone line 54, add a parallel resistance to line 54. This decreases the effective resistance of telephone line 54 causing a voltage drop due to the increased current flowing through the remote handsets 78. This problem can be compensated for by adjusting the voltage of telephone line 54 in the manner described.

Figure 5:
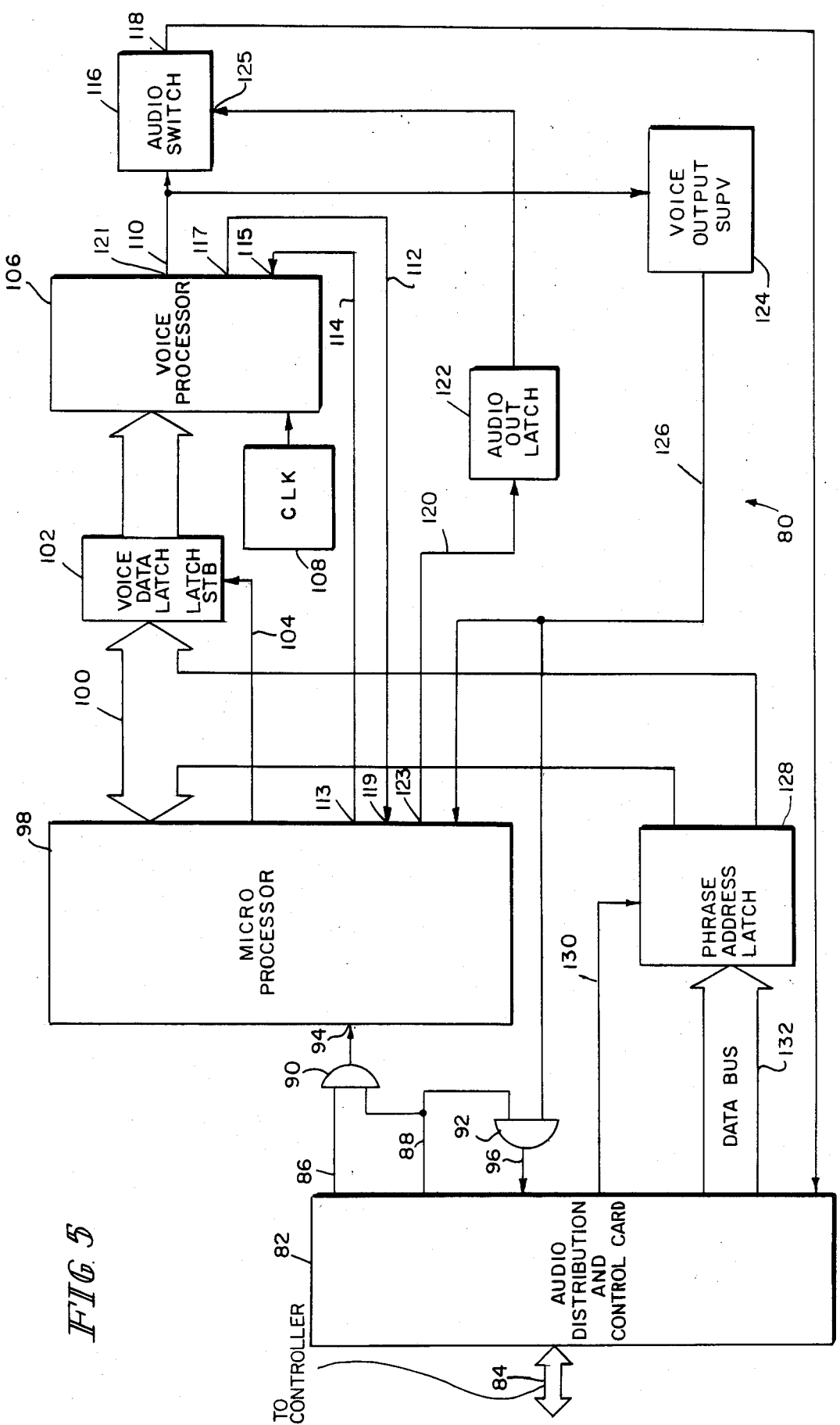
FIG. 5 is a block diagram of a voice synthesizer in accordance with this invention for life safety systems.

Turning to FIG. 5, a voice synthesizer 80 for providing a source of pre-stored voice messages in a life safety system is shown. Voice synthesizer 80 is coupled to an audio distribution and control card 82 which is coupled to controller 17 over bus 84. Audio distribution and control card 82 selects the audio source which will be amplified and sent out to the various zones.

A run strobe line 86 connects audio distribution and control card 82 to a first input of AND gate 90 of voice synthesizer 80. A tape enable line 88 also connects the audio distribution and control card 82 to a second input of AND gate 90 and to a first input of AND gate 92 of voice synthesizer 80. An output of AND gate 92 is coupled by trouble line 96 to audio distribution and control card 82. A phrase latch strobe line 130 connects audio distribution and control card 82 to a latch strobe input of a phrase address latch 128 of voice synthesizer 80. A data bus 132 couples audio distribution and control card 82 to data inputs of phrase address latch 128.

Voice synthesizer 80 also includes microprocessor 98 which is illustratively an Intel 8085 microprocessor system available from Intel Corporation, 3065 Bowers Avenue, Santa Clara, Calif. 95051. An output of AND gate 90 is coupled to an interrupt input 94 of microprocessor 98. Microprocessor 98 is coupled by data bus 100 to data outputs of phrase address latch 128 and data inputs of voice data latch 102. Data outputs of voice data latch 102 are coupled to data inputs of voice processor 106. Illustrativelv, voice processor 106 is a TMS5220A voice processor available from Texas Instruments, Inc., Post Office Box 5012, Dallas, Tex. 75222.

Voice synthesizer 80 also includes a clock 108 which is coupled to an oscillator input of voice processor 106. Microprocessor 98 also includes an IOWRITE output 113 which is coupled over IOWRITE line 114 to a WRITE strobe input 115 of voice processor 106. An interrupt output 117 of voice processor 106 is coupled over interrupt line 112 to a voice interrupt input 119 of microprocessor 98.

Voice processor 106 also includes an audio output 121 which is coupled over audio output line 110 to audio switch 116 and to an input of voice output supervisory circuit 124. An output 118 of audio switch 116 comprises the audio output of the voice synthesizer 80 and is coupled to audio distribution and control card 82. An output of voice output supervisory circuit 124 is coupled over trouble input line 126 to a trouble input of microprocessor 98 and to a second input of AND gate 92. An audio strobe output 123 of microprocessor 98 is connected over audio output strobe line 120 to an input of audio out latch 122. An output of audio out latch 122 is coupled to an enable input 125 of audio switch 116.

In operation, controller 17 (FIG. 1) will communicate with audio distribution and control card 82 and select voice synthesizer 80 as a source of audio signals. Controller 17 (FIG. 1) provides, over bus 84, an address which is tranmitted over data bus 132 from audio distribution and control card 82 to phrase address latch 128. This address is latched into phrase address latch 128 by a strobe pulse over phrase latch strobe line 130. This address is then presented on the data outputs of phrase address latch 128 and is read over bus 100 by microprocessor 98. Microprocessor 98 uses this information to select one of the voice messages which is stored in the memory of microprocessor 98. Each voice message which is stored in the memory of microprocessor 98 comprises a plurality of bytes stored in a table and the address is the address of the table.

Microprocessor 98 then reads the first byte from the table and outputs it over data bus 100 to voice data latch 102 and latches it into voice data latch 102 by latch strobe 104. The latched voice data in voice data latch 102 is then presented at the data inputs of voice processor 106 and is strobed into voice processor 106 by microprocessor 98 which pulses IOWRITE line 114. Voice processor 106 then processes the latched voice data and provides an output signal on audio output line 110. It should be understood that microprocessor 98 will be sequentially sending the bytes from the table which contains the stored voice message over data bus 100 into voice data latch 102 and then to voice processor 106. Voice processor 106 will act upon this sequence of bytes to generate the voice message on audio output line 110.

If the voice message is to be output by the life safety system, controller 17 (FIG. 1) will cause microprocessor 98 to pulse audio output strobe line 120 which sets audio output latch 122. This turns audio switch 116 on thereby coupling audio output line 110 through audio switch 116 to audio output 118. However, the status of voice synthesizer 80 can be determined without energizing audio switch 116. Voice output supervisory circuit 124 senses the signal on audio output 110 and, if an appropriate signal is not present when it should be, sets trouble line 126. Therefore, the condition of voice synthesizer 80 can be determined without broadcasting an audible voice message over the life safety system.

Microprocessor 98 would illustratively have several tables of stored voice messages which controller 17 (FIG. 1) could select from by sending the appropriate address to phrase address latch 128. This address will be read by microprocessor 98 to determine which voice message is to be output to the voice processor 106 to be turned into an audible voice message.

Although the invention has been described in detail with reference to certain preferred embodiments and specific examples, variations and modifications exist within the scope and spirit of the invention as described and as defined in the following claims.

What is claimed is:

1. In a life safety system for monitoring a building or the like and having a plurality of detectors located throughout the building for detecting alarm conditions, a plurality of speakers located throughout the building, a source of pre-stored voice messages which can be broadcast over the speakers, a telephone network, the improvement comprising a voice synthesizer for providing the source of pre-stored voice messages and the telephone network comprising a constant volume telephone network which comprises a telephone line, a plurality of telephones connected to the telephone lines including a master telephone having a transmitter, a telephone line power supply having an adjustable output voltage, sensing and adjusting means for sensing the number of telephones off-hook and causing the output voltage of the telephone line power supply to be adjusted in response to the number of telephone off-hook, the telephone power supply comprising a voltage regulator having a DC input coupled to a source of DC voltage, a regulated DC output coupled to the telephone line, and an adjust input coupled to the sensing and adjusting means, and the telephone network includes means for coupling the master telephone's transmitter to the adjust input of the voltage regulator.

2. The improvement of claim 1 wherein the voice synthesizer includes means for storing a plurality of digitized voice messages, means for selecting one of the stored digitized voice messages, and means for processing the selected stored digitized voice message to generate an analog voice message therefrom.

3. The improvement of claim 2 wherein the life safety system includes means for sending a voice message address to the voice synthesizer and the voice message selecting means includes means for selecting message based upon the voice message address.

* * * * *